United States Patent
Lee et al.

(10) Patent No.: US 11,108,091 B2
(45) Date of Patent: Aug. 31, 2021

(54) BATTERY MODULE, AND BATTERY PACK AND ENERGY STORAGE SYSTEM INCLUDING THE SAME

(71) Applicant: LG CHEM, LTD., Seoul (KR)

(72) Inventors: Bum-Hyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 201 days.

(21) Appl. No.: 16/337,269

(22) PCT Filed: Jul. 5, 2018

(86) PCT No.: PCT/KR2018/007648
§ 371 (c)(1),
(2) Date: Mar. 27, 2019

(87) PCT Pub. No.: WO2019/022407
PCT Pub. Date: Jan. 31, 2019

(65) Prior Publication Data
US 2020/0036049 A1 Jan. 30, 2020

(30) Foreign Application Priority Data
Jul. 28, 2017 (KR) ........................ 10-2017-0096343

(51) Int. Cl.
*H01M 10/42* (2006.01)
*H01M 10/48* (2006.01)
(Continued)

(52) U.S. Cl.
CPC ....... *H01M 10/425* (2013.01); *H01M 10/482* (2013.01); *H01M 10/486* (2013.01); *H01M 50/20* (2021.01); *H01M 50/502* (2021.01)

(58) Field of Classification Search
CPC ... H01M 2/0245–0247; H01M 50/202; H01M 50/505
See application file for complete search history.

(56) References Cited

U.S. PATENT DOCUMENTS

2013/0143086 A1   6/2013   Lee et al.
2013/0330584 A1   12/2013  Lee et al.
(Continued)

FOREIGN PATENT DOCUMENTS

CN   104471743 A   3/2015
CN   104752639 A   7/2015
(Continued)

OTHER PUBLICATIONS

International Search Report (PCT/ISA/210) issued in PCT/KR2018/007648, dated Oct. 23, 2018.

*Primary Examiner* — Robert S Carrico
(74) *Attorney, Agent, or Firm* — Birch, Stewart, Kolasch & Birch, LLP

(57) ABSTRACT

A battery module having a plurality of battery cells stacked on one another, each battery cell having a first electrode lead protruding therefrom, and at least one sensing assembly mounted to at least one side of the plurality of battery cells and configured to electrically connect the first electrode leads is provided. The at least one sensing assembly includes a sensing bus bar electrically connected to the first electrode leads, and a plurality of sensing housing parts configured so that the sensing bus bar is mounted to a front surface thereof. Each sensing housing part of the plurality of sensing housing parts allowing a corresponding first electrode lead to pass therethrough toward the sensing bus bar. Each sensing housing part being detachably assembled with an adjacent sensing housing part of the plurality of sensing housing parts.

14 Claims, 6 Drawing Sheets

(51) Int. Cl.
  *H01M 50/20* (2021.01)
  *H01M 50/502* (2021.01)

(56) References Cited

U.S. PATENT DOCUMENTS

| | | | |
|---|---|---|---|
| 2014/0363711 A1 | 12/2014 | Zhao | |
| 2015/0125727 A1 | 5/2015 | Lui et al. | |
| 2016/0133898 A1* | 5/2016 | Choi | H01M 10/0481 429/151 |
| 2016/0301049 A1 | 10/2016 | Zhu et al. | |
| 2017/0125774 A1 | 5/2017 | Choi et al. | |
| 2018/0006281 A1* | 1/2018 | Eom | H01M 10/482 |
| 2018/0076487 A1 | 3/2018 | Lee et al. | |
| 2021/0143498 A1* | 5/2021 | Lee | H01M 10/625 |

FOREIGN PATENT DOCUMENTS

| | | |
|---|---|---|
| CN | 104752666 A | 7/2015 |
| CN | 105308770 A | 2/2016 |
| EP | 2 328 205 A2 | 6/2011 |
| EP | 3 002 804 A1 | 4/2016 |
| EP | 3 076 456 A1 | 10/2016 |
| EP | 3 151 332 A1 | 4/2017 |
| JP | 2012-138268 A | 7/2012 |
| JP | 2014-516457 A | 7/2014 |
| JP | 2016-76451 A | 5/2016 |
| KR | 10-1217564 B1 | 1/2013 |
| KR | 10-2014-0084563 A | 7/2014 |
| KR | 10-2014-0093424 A | 7/2014 |
| KR | 10-2014-0137044 A | 12/2014 |
| KR | 10-1542072 B1 | 8/2015 |
| KR | 10-2015-0113827 A | 10/2015 |
| KR | 10-2016-0026469 A | 3/2016 |
| KR | 10-2016-0048658 A | 5/2016 |
| KR | 10-2017-0027543 A | 3/2017 |
| KR | 10-2017-0034560 A | 3/2017 |
| KR | 10-2017-0050510 A | 5/2017 |

* cited by examiner

BATTERY MODULE, AND BATTERY PACK AND ENERGY STORAGE SYSTEM INCLUDING THE SAME

TECHNICAL FIELD

The present disclosure relates to a battery module, and a battery pack and an energy storage system including the battery module.

The present application claims priority to Korean Patent Application No. 10-2017-0096343 filed on Jul. 28, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery cells configuring the battery module or the battery pack are generally pouch-type secondary batteries that may be easily stacked on one another.

A conventional battery module generally includes a sensing assembly for connecting the electrode leads of the plurality of stacked battery cells and sensing the voltage of the battery cells. The sensing assembly is generally constructed as a single housing structure to cover protruding portions of the electrode leads of the battery cells.

However, since the conventional sensing assembly has a single housing structure, when the total size of the battery cells is changed by increasing or decreasing the number of stacked battery cells due to the change of capacity of the battery module or the battery pack, a housing suitable for the changed size should be designed again.

DISCLOSURE

Technical Problem

The present disclosure is directed to providing a battery module, which includes a sensing assembly with convenient and easy expandability, and a battery pack and an energy storage system including the battery module.

Technical Solution

In one aspect of the present disclosure, there is provided a battery module, comprising: a plurality of battery cells stacked on one another, each battery cell having a first electrode lead protruding therefrom; and at least one sensing assembly mounted to at least one side of the plurality of battery cells and configured to electrically connect the first electrode leads, wherein the at least one sensing assembly includes: a sensing bus bar electrically connected to the first electrode leads; and a plurality of sensing housing parts configured so that the sensing bus bar is mounted to a front surface thereof, each sensing housing part of the plurality of sensing housing parts allowing a corresponding first electrode lead to pass therethrough toward the sensing bus bar, each sensing housing part being detachably assembled with an adjacent sensing housing part of the plurality of sensing housing parts.

A total number of the sensing housing parts may correspond to a total number of the battery cells.

Each sensing housing part may be assembled by being fitted into the adjacent sensing housing part in a block-to-block coupling pattern.

Each sensing housing part may have a convex protrusion and a concave groove corresponding to a shape of the convex protrusion.

The convex protrusion and the concave groove may have at least one of a circular shape, a rectangular shape, a trapezoidal shape and an oval shape.

At least one anti-movement rib may be formed at a rear surface of the plurality of sensing housing parts to prevent the battery cells from moving.

The sensing assembly may include a temperature sensor provided between the plurality of sensing housing parts and the sensing bus bar.

A sensor mounting groove may be defined between two adjacent sensing housing parts of the plurality of sensor housing parts when the plurality of sensing housing parts are assembled, and the temperature sensor is mounted in the sensor mounting groove.

Each sensing housing part may include an anti-movement rib formed at a rear surface thereof to prevent the battery cells from moving.

In addition, present disclosure provides a battery pack comprising: at least one battery module according to the above embodiment; and a pack case configured to package the at least one battery module.

Moreover, the present disclosure provides an energy storage system comprising at least one battery pack according to the former embodiments.

Advantageous Effects

According to various embodiments as above, it is possible to provide a battery module, which includes a sensing assembly with convenient and easy expandability, and a battery pack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
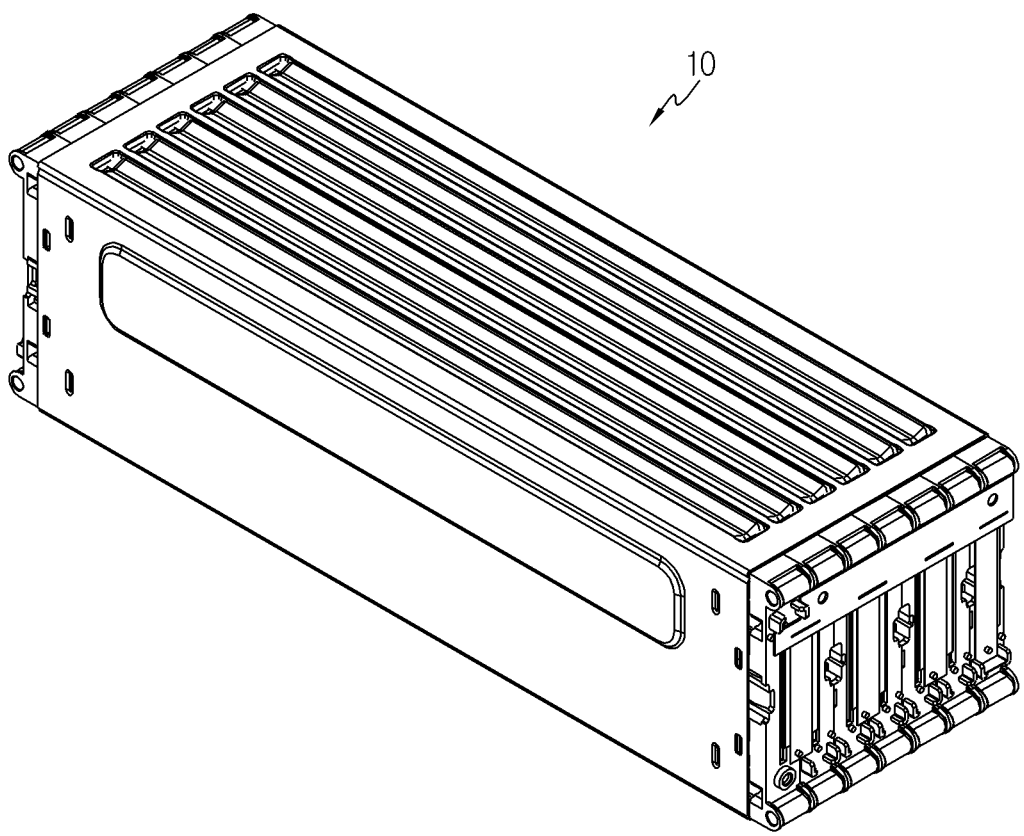
FIG. 1 is a diagram for illustrating a battery module according to an embodiment of the present disclosure.
Figure 2:
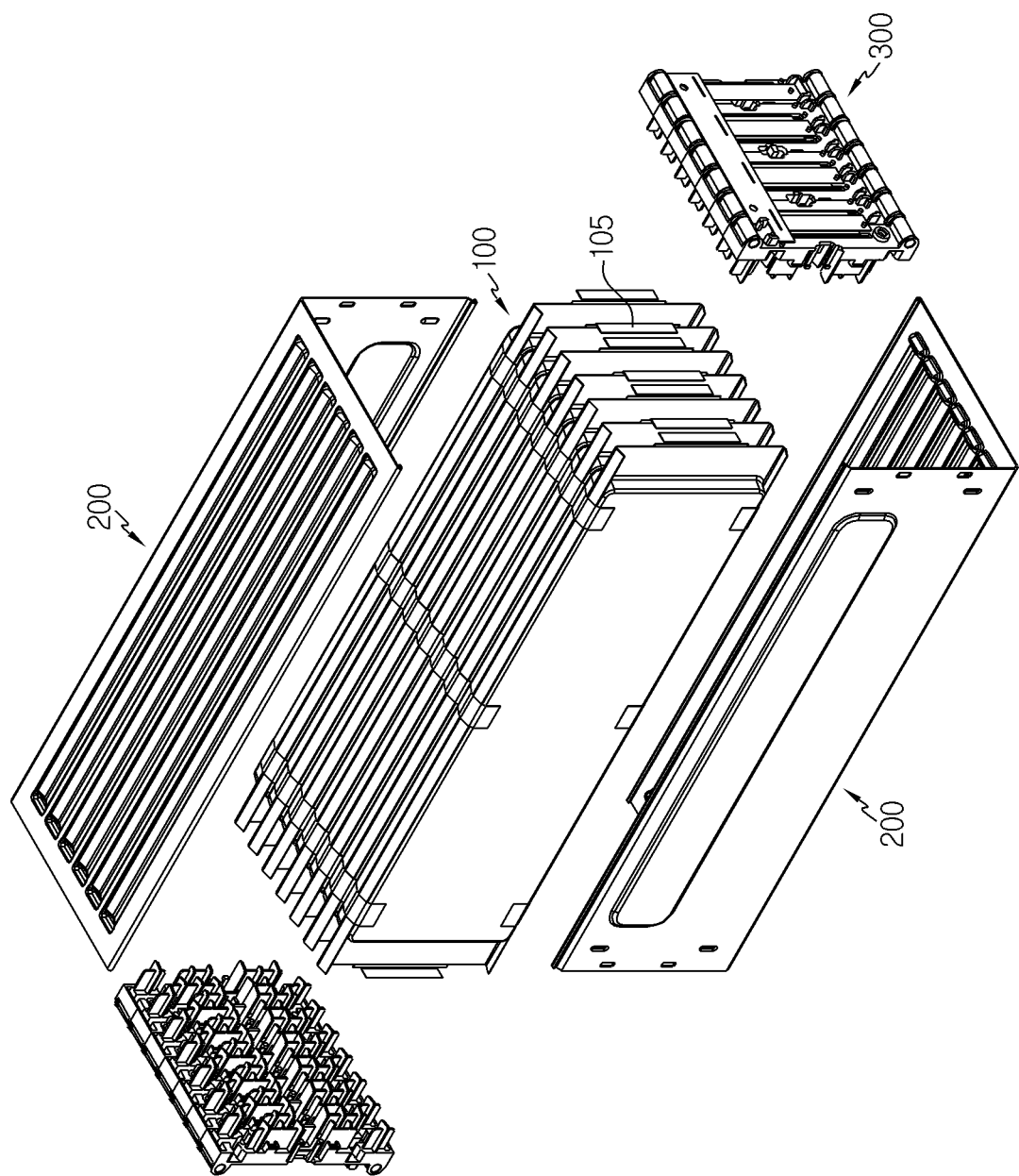
FIG. 2 is an exploded perspective view showing the battery module of FIG. 1.
Figure 3:
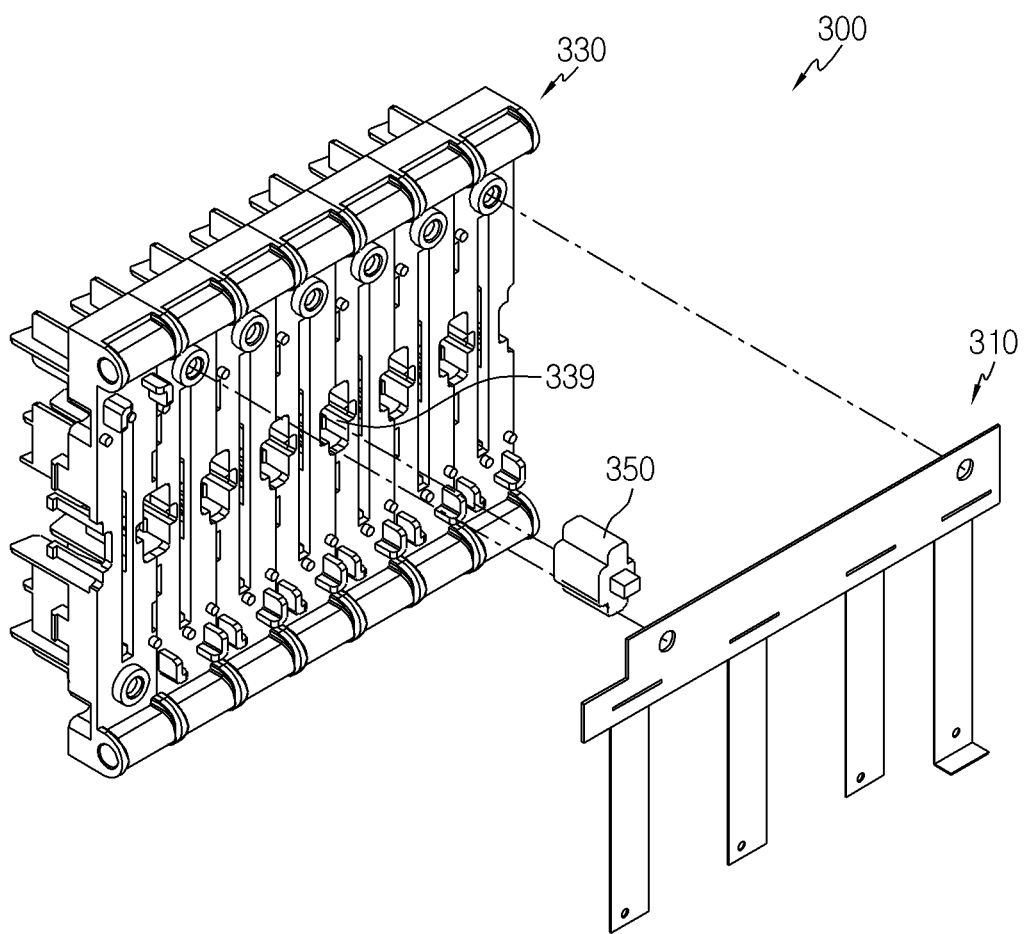
FIG. 3 is an exploded perspective view showing a sensing assembly of the battery module of FIG. 2.
Figure 4:
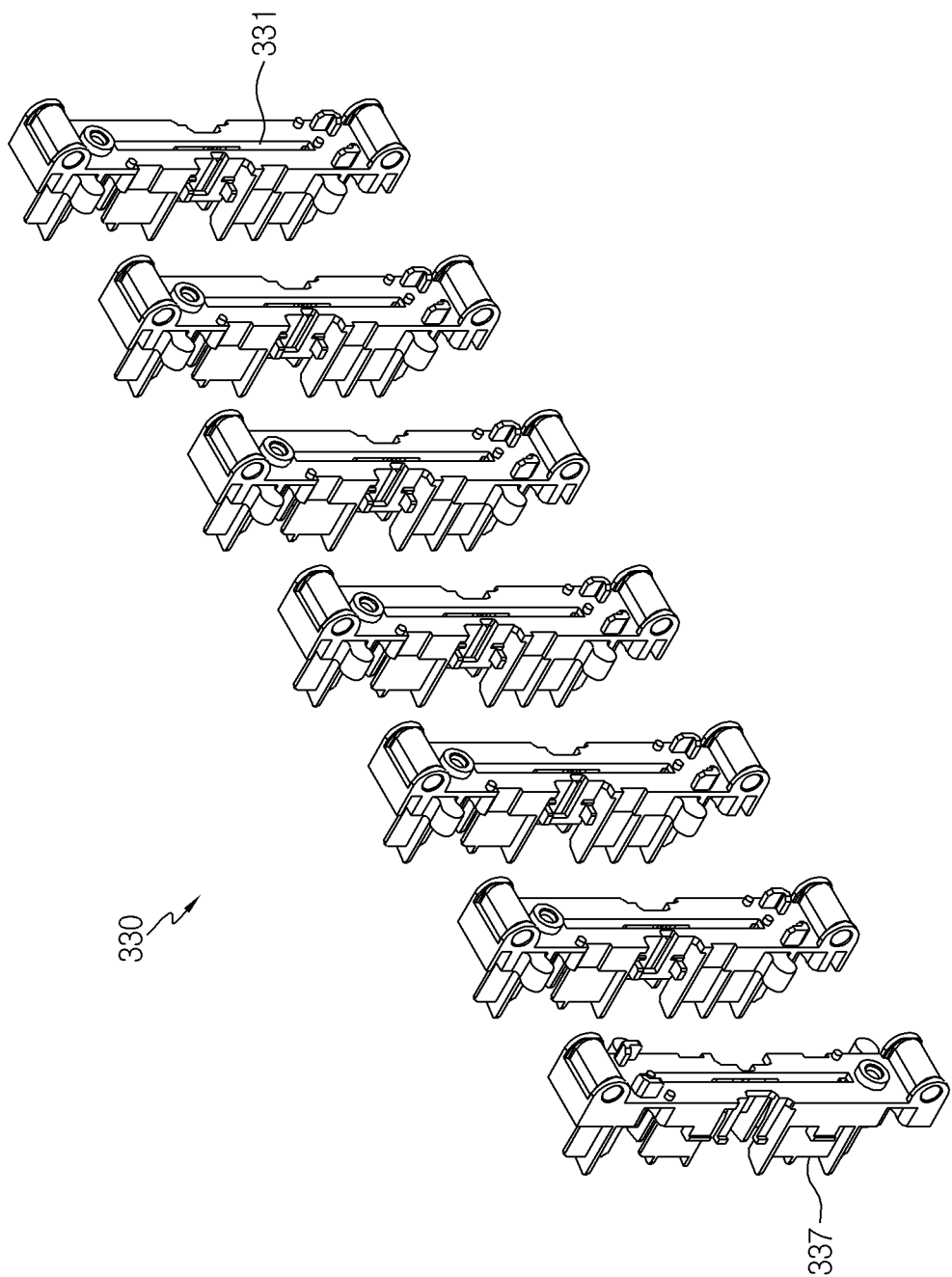
FIG. 4 is an exploded perspective view showing sensing housing parts of the sensing assembly of FIG. 3.
Figure 5:
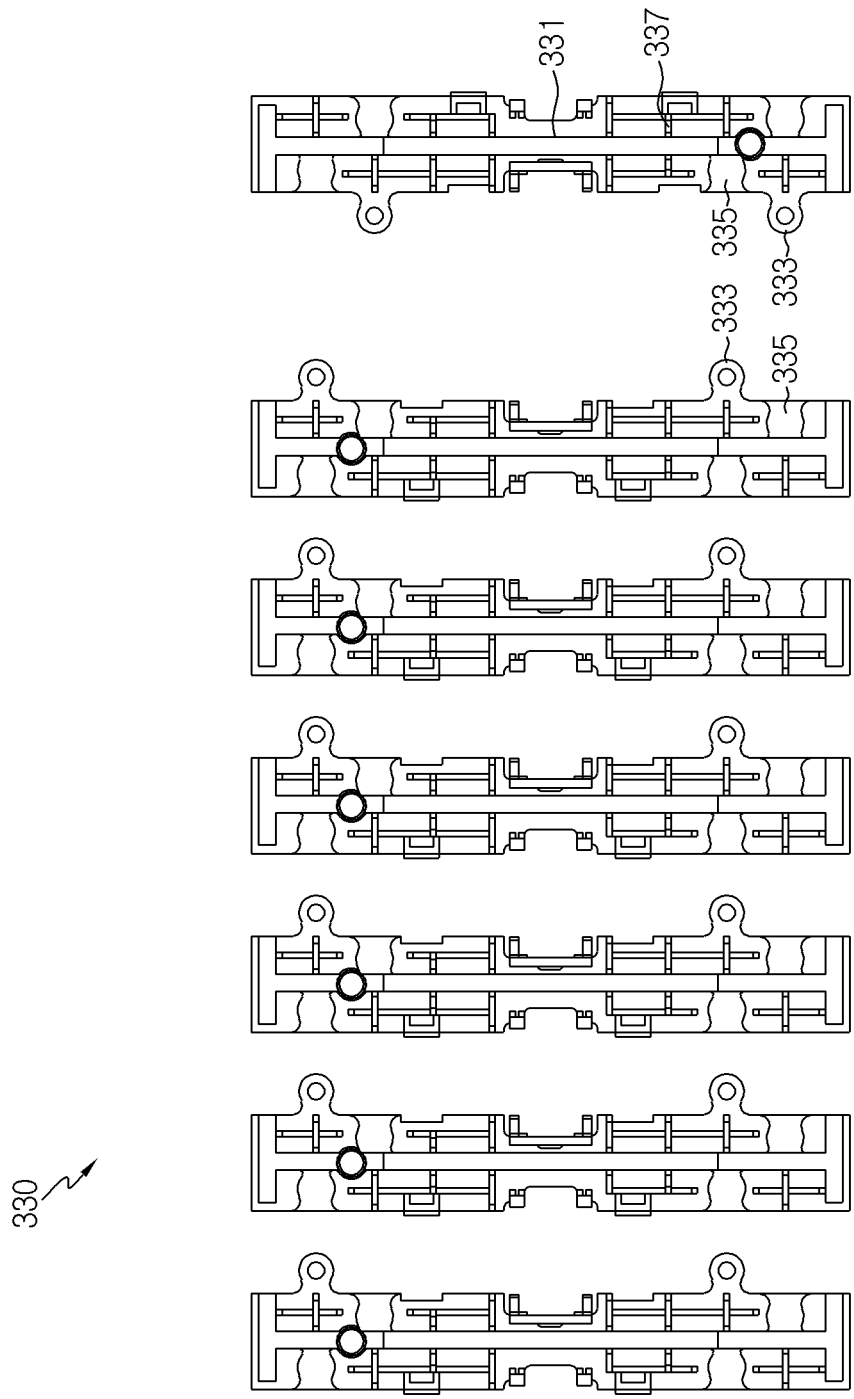
FIG. 5 is a diagram for illustrating an assembled form of the sensing housing parts of FIG. 4.

FIG. 1 is a diagram for illustrating a battery module according to an embodiment of the present disclosure, FIG. 2 is an exploded perspective view showing the battery module of FIG. 1. FIG. 3 is an exploded perspective view showing a sensing assembly of the battery module of FIG. 2, FIG. 4 is an exploded perspective view showing sensing housing parts of the sensing assembly of FIG. 3, and FIG. 5 is a diagram for illustrating an assembled form of the sensing housing parts of FIG. 4.

Referring to FIGS. 1 to 5, a battery module 10 may include a battery cell 100, a module case 200 and a sensing assembly 300.

The battery cell 100 may be a secondary battery, or a pouch-type secondary battery. The battery cell 100 may be provided in plural, and the plurality of battery cells 100 may be stacked to be electrically connected to each other.

Each of the plurality of battery cells 100 may include an electrode assembly, a battery case for accommodating the electrode assembly, and a pair of electrode leads 105 protruding out of the battery case and connected to the electrode assembly.

The module case 200 may accommodate the plurality of battery cells 100. The module case 200 may include first and second cases that are coupled to each other to cover the plurality of battery cells 100.

The sensing assembly 300 is for sensing the voltage of the plurality of battery cells 100 and may be mounted to at least one side of the plurality of battery cells 100, or respectively to both sides of the plurality of battery cells 100 in this embodiment.

The sensing assembly 300 electrically connects the electrode leads 105 of the plurality of battery cells 100 and may include a sensing bus bar 310, a sensing housing part 330 and a temperature sensor 350.

The sensing bus bar 310 may be coupled to the electrode leads 105 by welding or the like so as to be electrically connected to the electrode leads 105 of the plurality of battery cells 100.

The sensing housing part 330 functions as a housing of the sensing assembly 300 and may allow various components of the sensing assembly 300 including the sensing bus bar 310 to be placed thereon. The sensing housing part 330 may be provided in plural, and the plurality of sensing housing parts 330 may cover both sides of the battery cells 100. For example, the sensing bus bar 310 may be mounted to a front surface of the plurality of sensing housing parts 330.

The plurality of sensing housing parts 330 may allow the electrode leads 105 of the battery cells 100 to pass toward the sensing bus bar 310, and may cover both sides of the battery cells 100.

The plurality of sensing housing parts 330 may be provided so as to be detachably assembled with each other. In detail, the plurality of sensing housing parts 330 may be assembled by being fitted into each other in a block-to-block coupling pattern.

The plurality of sensing housing parts 330 may be provided in a number corresponding to the number of the battery cells 100. Specifically, since the plurality of sensing housing parts 330 may cover both sides of the battery cells 100, two sensing housing parts may be provided for one battery cell 100. Accordingly, the number of the sensing housing parts 330 may be double of the number of the battery cells 100.

Each of the plurality of sensing housing parts 330 may include a lead slot 331, a convex protrusion 333, a concave groove 335, an anti-movement rib 337 and a sensor mounting groove 339.

The lead slot 331 is provided at the center of the sensing housing part 330 and allows the electrode lead 105 of the battery cell 100 to pass to the front of the sensing housing part 330. The electrode leads 105 may be electrically coupled to the sensing bus bar 310 after passing through the lead slot 339.

The convex protrusion 333 and the concave groove 335 are for block-to-block coupling between the plurality of sensing housing parts 330 and may be provided at mutually corresponding positions in an assembling direction of the plurality of sensing housing parts 330.

The convex protrusion 333 and the concave groove 335 may have at least one of a circular shape, a rectangular shape, a trapezoidal shape and an oval shape. However, without being limited thereto, the convex protrusion 333 and the concave groove 335 may also have other shapes to enable the block-to-block coupling.

The anti-movement rib 337 is for preventing the plurality of battery cells 100 from moving in the protruding direction of the electrode leads 105 of the plurality of battery cells 100 and may be formed at a rear surface of the sensing housing part 330.

The anti-movement ribs 337 may be disposed to face each other with the lead slot 331 being interposed therebetween, and may support the battery cell 100 disposed at the rear of the lead slot 331.

The sensor mounting groove 339 is for mounting the temperature sensor 350, explained later, and may be formed as the sensing housing parts 330 facing each other are assembled.

The temperature sensor 350 is for measuring the temperature of the plurality of battery cells 100 and may be inserted into and mounted to the sensor mounting groove 339.

As described above, in this embodiment, the housing structure of the sensing assembly 300 covering the battery cells 100 may be realized by using the plurality of sensing housing parts 330 that are configured to be detachably assembled with each other.

Accordingly, in this embodiment, even though the number of the battery cells 100 of the battery module 10 is changed depending on the required capacity or total size, the housing of the sensing assembly 300 may be realized just by adjusting the number of the sensing housing parts 330 assembled with each other to correspond to the number of the battery cells 100, without designing a new housing structure.

Thus, in this embodiment, it is possible to provide the sensing assembly 300 with convenient and easy expandability by using the sensing housing parts 330 assembled with each other, without a new housing structure.

Therefore, the battery module 10 according to this embodiment may significantly increase the efficiency of the assembling process of the sensing assembly 300.

Figure 6:
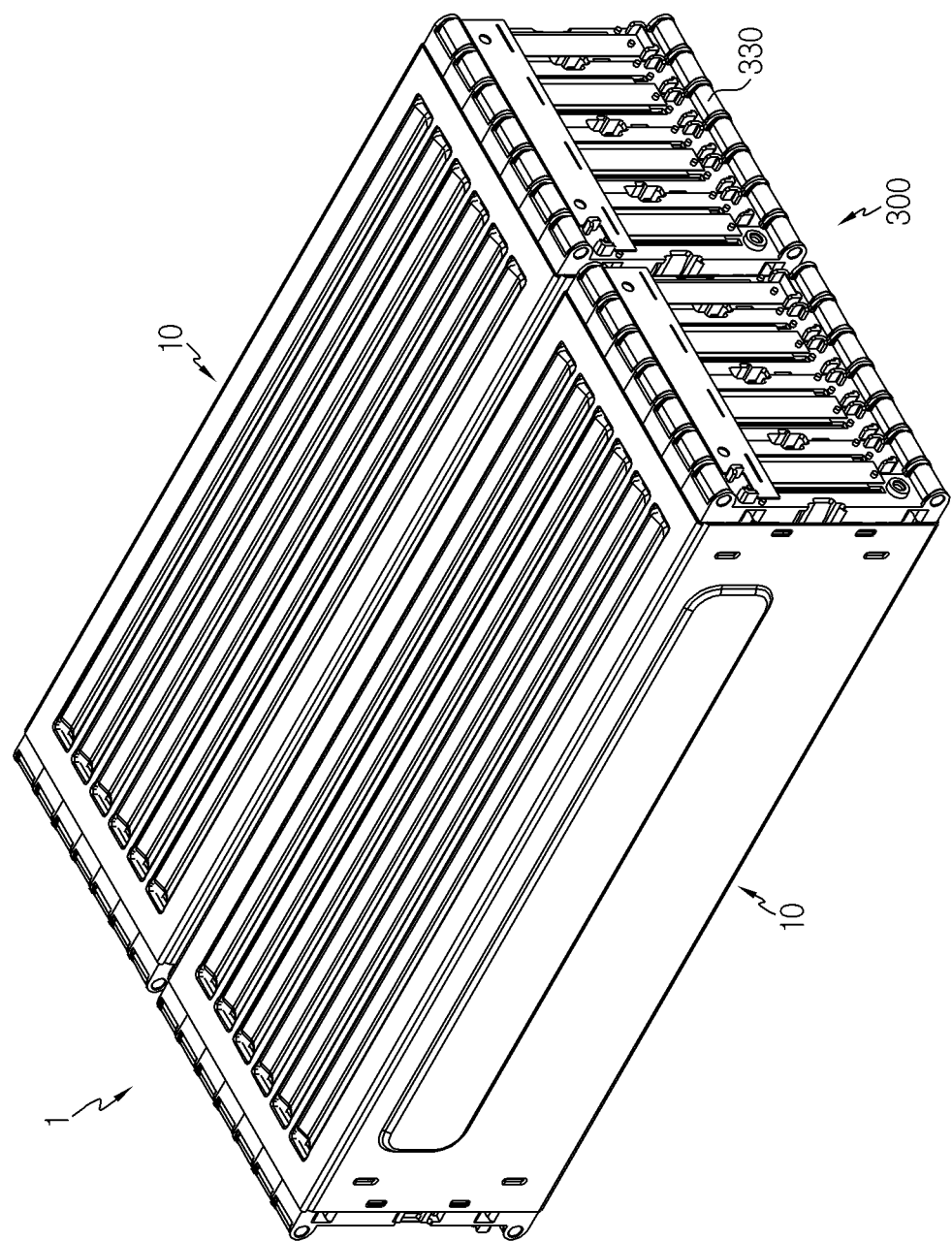
FIG. 6 is a diagram for illustrating a battery pack according to an embodiment of the present disclosure.

FIG. 6 is a diagram for illustrating a battery pack according to an embodiment of the present disclosure.

Referring to FIG. 6, a battery pack 1 may be provided as an assembly of the plurality of battery modules 10. Though not shown, the battery pack 1 may further include a pack case for packaging the plurality of battery modules 10.

The battery pack 1 may be provided as an energy source of an energy storage system that is used for vehicles such as an electric vehicle or a hybrid vehicle, and also for household or industrial purposes.

When a plurality of battery modules 10 are provided to configure the battery pack 1 as described above, in this embodiment, the sensing housing parts 330 detachably assembled with each other are provided in a number corresponding to the number of the battery cells of the battery modules 10, to configure the sensing assembly 300.

As described above, if the sensing assembly 300 of this embodiment is used, when the capacity of the battery cells is expanded to, for example, configure the battery pack 1, it is possible to implement a sensing assembly 300 suitable for the expanded capacity by increasing the number of the sensing housing parts 330 detachably assembled with each other, without redesigning a separate sensing assembly 300 therefor.

In other words, in this embodiment, by using the sensing housing parts 330, even when the battery pack 1 is configured to have a larger capacity and total size than the battery module 10, it is not required to design a sensing assembly corresponding to the total size of the battery pack 1, different from the conventional technique.

Accordingly, in this embodiment, when the battery module 10 or the battery pack 1 is configured using the battery cells 100, it is possible to implement the sensing cell 300 with convenient and easy expandability.

According to various embodiments as described above, it is possible to provide a battery module 10, which includes the sensing assembly 300 with convenient and easy expandability, and a battery pack 1 and an energy storage system including the battery module.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells stacked on one another to form a battery stack having a front surface and a rear surface, each battery cell having a first electrode lead protruding from the front surface of the battery stack; and
   a first sensing assembly mounted to the battery stack and configured to electrically connect the first electrode leads,
   wherein the first sensing assembly includes:
   a sensing bus bar electrically connected to the first electrode leads; and
   a plurality of sensing housing parts covering the front surface of the battery stack and configured so that the sensing bus bar is mounted to a front surface thereof, each sensing housing part of the plurality of sensing housing parts allowing a corresponding first electrode lead to pass therethrough toward the sensing bus bar, each sensing housing part being detachably assembled with an adjacent sensing housing part of the plurality of sensing housing parts.

2. The battery module according to claim 1, wherein a total number of the sensing housing parts correspond to a total number of the battery cells.

3. The battery module according to claim 2, wherein each sensing housing part is assembled by being fitted into the adjacent sensing housing part in a block-to-block coupling pattern.

4. The battery module according to claim 3, wherein each sensing housing parts has a convex protrusion and a concave groove corresponding to a shape of the convex protrusion.

5. The battery module according to claim 4, wherein the convex protrusion and the concave groove have at least one of a circular shape, a rectangular shape, a trapezoidal shape and an oval shape.

6. The battery module according to claim 1, wherein at least one anti-movement rib is formed at a rear surface of the plurality of sensing housing parts to prevent the battery cells from moving.

7. The battery module according to claim 1, wherein the sensing assembly includes a temperature sensor provided between the plurality of sensing housing parts and the sensing bus bar.

8. The battery module according to claim 7, wherein, a sensor mounting groove is defined between two adjacent sensing housing parts of the plurality of sensor housing parts when the plurality of sensing housing parts are assembled, and
   wherein the temperature sensor being mounted in the sensor mounting groove.

9. The battery module according to claim 1, wherein each sensing housing part includes an anti-movement rib formed at a rear surface thereof to prevent the battery cells from moving.

10. The battery module according to claim 1, wherein the plurality of sensing housing parts are between the plurality of battery cells and the sensing bus bar.

11. The battery module according to claim 1, wherein the plurality of battery cells are stacked in a first direction,
    wherein the plurality of sensing housing parts are stacked in the first direction, and
    wherein the plurality of sensing housing parts are spaced from the plurality of battery cells in a second direction.

12. The battery module according to claim 1, further comprising:
    a second sensing assembly mounted to and configured to electrically connect second electrode leads,
    wherein the second sensing assembly includes:
    a second sensing bus bar electrically connected to the second electrode leads; and
    a plurality of sensing housing parts covering the rear surface of the battery stack, each sensing housing part of the plurality of sensing housing parts allowing a corresponding second electrode lead to pass therethrough toward the second sensing bus bar, each sensing housing part being detachably assembled with an adjacent sensing housing part of the plurality of sensing housing parts.

13. A battery pack, comprising:
at least one battery module as defined in claim 1; and
a pack case configured to package the at least one battery module.

14. An energy storage system, comprising:
at least one battery pack as defined in claim 13.

* * * * *